May 1, 1934.    A. V. HOSE    1,956,987
TRIP VALVE
Filed Jan. 28, 1931    2 Sheets-Sheet 1
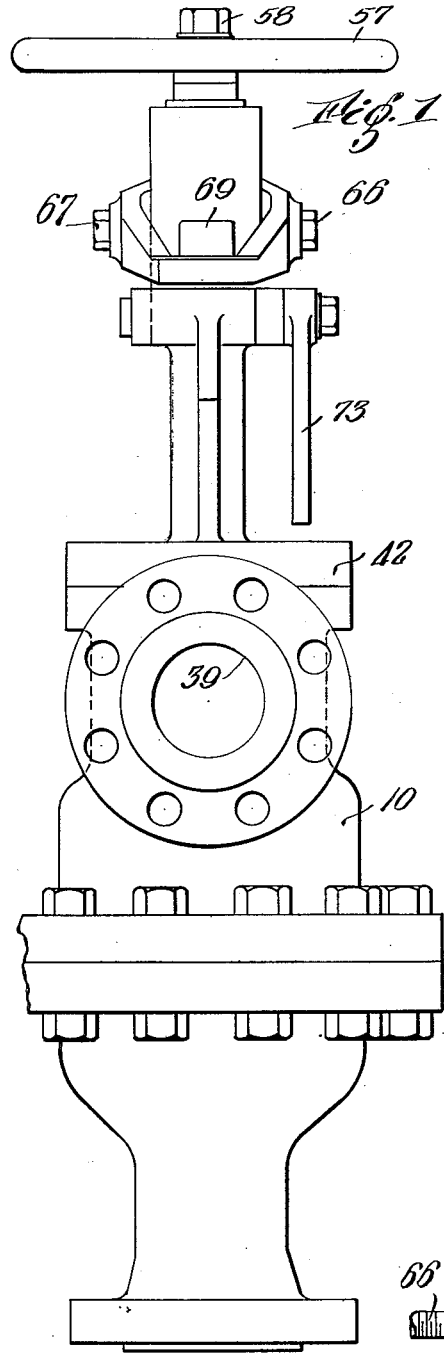
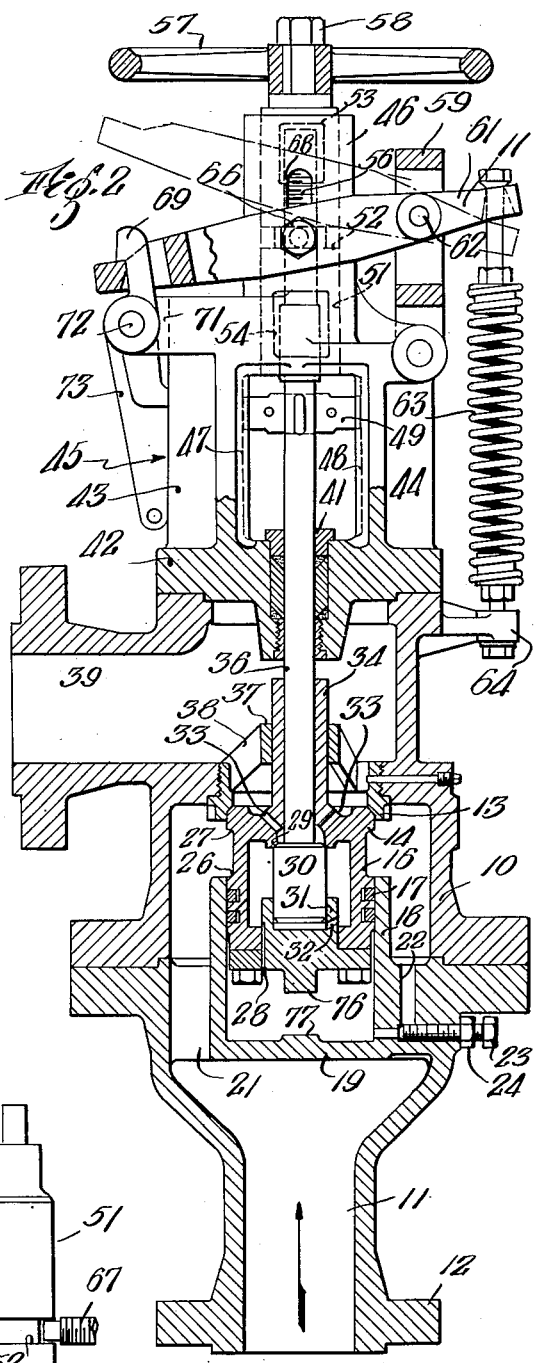
Inventor
Alexander V. Hose
his Attorneys

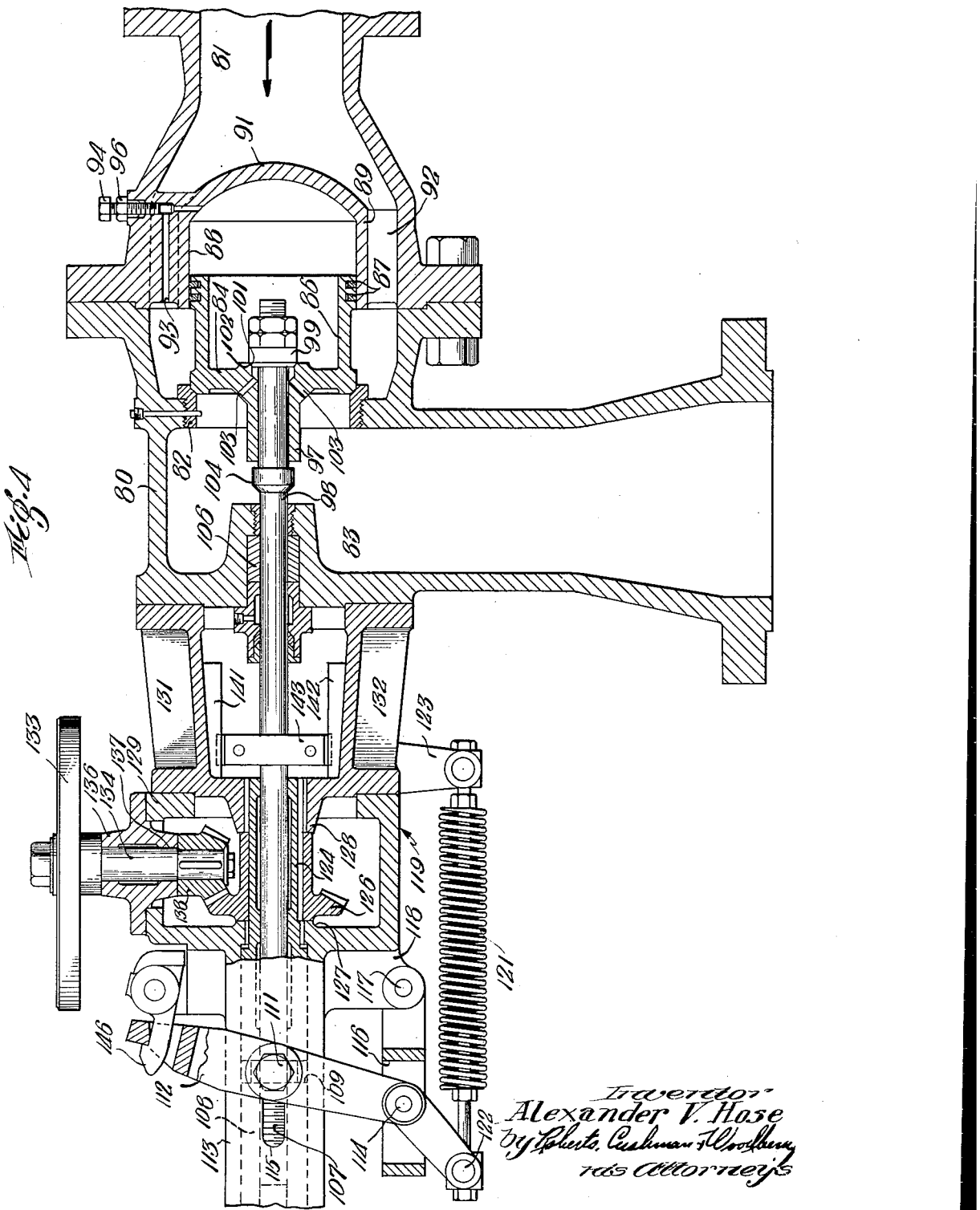

Patented May 1, 1934

1,956,987

UNITED STATES PATENT OFFICE 1,956,987

TRIP VALVE

Alexander V. Hose, Salem, Mass., assignor to Atwood & Morrill Co., Salem, Mass., a corporation of Massachusetts Application January 28, 1931, Serial No. 511,712

3 Claims. (Cl. 137—139)

This invention relates to trip valves of the pressure loaded and mechanically operated type. Valves of this character are commonly employed for controlling the delivery of a fluid under pressure to a prime mover, as to a turbine, for example, and in such cases are adapted to close automatically in response to some abnormal operating condition, such as sudden drop in pressure in the pipe line due to breakage of parts, or to excessive operating speed of the prime mover, thereby to avoid damage which might otherwise result from continued flow of the motive fluid. These valves also are usually adapted to be opened and closed manually to provide for resuming operation when normal conditions again prevail, as well as for regulating the flow of motive fluid during normal operation.

It is customary to equip valves of this general class with a stem or spindle which moves in guide bearings in the housing or valve body during opening or closing movement of the valve, and it is highly desirable that this stem or spindle should be capable only of axial or rectilinear motion, as any turning or circumferential movement has a tendency to produce rapid and excessive wear and increases the difficulty of controlling leakage. In order to accomplish these results it has been proposed to make the stem in two parts which are connected for relative rotary movement, one of these parts being axially slidable in the valve body but prevented from rotary movement, while the other is freely rotatable and has threaded engagement with the trip mechanism, but arrangements of this kind are complicated and expensive to manufacture.

Objects of the present invention are to improve the construction of trip valves by providing improved and simple means for moving the stem or spindle thereof axially but without rotation; to provide a construction in which improved operating mechanism actuates the valve by means of a one-piece stem; and to provide apparatus of the class described which is dependable in action and of strong and rugged construction.

In the drawings:

Fig. 1 is an end elevation of a trip valve embodying the invention;

Fig. 2 is a side view of the valve shown in Fig. 1, showing the main valve structure in section, and portions of the operating mechanism in elevation, some parts being omitted and other parts being broken away for the purpose of illustration;

Fig. 3 is a detail view in elevation, illustrating the nut for operating the valve stem; and Fig. 4 is a view similar to Fig. 2 but showing a modified form of construction.

The trip valve selected for illustration in Figs. 1 and 2 comprises a body 10 having an inlet passage 11 extending upwardly from the bottom flange 12 through the body to a port formed by the annular valve seat 13. This valve seat cooperates with the movable main valve disk 14, the latter being constituted by one end of a hollow piston 16, the other end or head of which is fitted with packing rings 17 which operate in a cylinder 18 having a closed lower end 19. The cylinder 18 is supported in the inlet passage and spaced from the side walls of the body 10 by radial connecting webs 21. One or more passages 22 extend through the webs 21 to the space within the lower end of the cylinder. Preferably the flow through these passages is controlled by an adjusting screw 23 which is locked in adjusted position by a lock nut 24. The exterior of the piston 16 is formed with opposed shoulders 26 and 27 having substantially equal pressure areas. One or more ports 28 afford communication between the interior of the hollow piston 16 and the space enclosed by the lower end of the cylinder 18.

The valve disk 14 forming the upper end of the hollow piston is itself provided with an internal annular seat 29 which receives a pilot valve 30, the latter having a cylindrical head which is slidably received in a cylindrical recess formed in an annular boss 31 carried by the lower head of the piston 16. A port 32 affords communication from the space within the hollow piston 16 to that between the annular boss 31 and the lower end of the pilot valve head. Ports 33 extend through the main valve disk 14 and terminate at points within the circumference of seat 29 so that the flow through these ports may be controlled by the pilot valve. The main valve disk 14 also carries on its upper side a cylindrical extension 34 which slidably receives the one-piece stem 36 to which the pilot valve is secured. This cylindrical extension 34 is slidable in a bearing 37 carried by radial arms 38 mounted upon the seat ring 13. The exhaust passage extends from the seat provided in the ring 13 upwardly around the radial arms 38 and the cylindrical extension 34 and out of the valve body 10 through the substantially horizontal passage 39.

The valve stem or spindle 36 extends upwardly through a stuffing box 41 carried by the valve bonnet or cover 42. This cover or bonnet also has mounted thereon a frame work 45 comprising the upright members 43 and 44 which support a cylindrical guide housing or casing 46. Vertically extending guideways 47 and 48 are formed on the inner sides of the uprights 43 and 44, and a guide 49 is rigidly attached to the spindle 36 in any approved manner and operates in these guideways to prevent the spindle from turning or partaking of any rotary motion.

The cylindrical guide casing 46 slidably receives an elongate nut 51, (Figs. 2 and 3) whose exterior surface is substantially cylindrical, and which has an exterior circumferential groove 52 disposed approximately midway thereof, the bore of the nut being threaded for a suitable distance substantially midway between the ends of the nut, but preferably being of somewhat larger diameter at other points, as illustrated at 53 and 54, to avoid undue friction on the valve stem. The upper end of the stem 36 has a threaded portion 56 which engages the threaded bore of the nut 51. A hand wheel 57 is rigidly attached to the squared upper end of the nut 51 by means of an attaching bolt 58.

A link 59 is pivotally mounted at one end on the frame 45 and a trip lever 61 has a pivotal connection 62 with this link. A tension spring 63 is secured at one end to a bracket 64, and at its other end is pivotally secured to one end of the trip lever 61. This lever is preferably in the form of a yoke which embraces the guide casing 46 and carries on the opposite sides thereof bolts 66 and 67 (Fig. 3), the inner ends of which project through vertical slots 68, formed in the guide casing and into the circumferential slot 52 in the exterior of the rotary nut 51. A latch 69 is pivotally mounted on a bracket 71 in a position to engage the other or free end of the lever 61. Preferably this latch is secured to a rotary shaft 72 carried by the bracket 71 and having fixed thereon an operating arm 73 which may depend below the shaft as shown.

The parts of this apparatus are arranged in Figs. 1 and 2 with the main valve 16 on its seat 13 and thereby effectively closing the inlet passage 11 and preventing flow of motive fluid through the valve body. Motive fluid from the inlet 11 passes through the duct 22 to the interior of the cylinder 18 below the main valve and from this cylinder through the ports 28 into the hollow piston 16, the main valve being held on its seat by unbalanced pressure acting against the lower end of the piston 16. To open the main valve 14, the hand wheel 57 may be rotated so as to cause the rotary nut to move the spindle 36 downwardly, it being assumed that the trip lever 61 is locked in the position shown in these figures by the latch 69, so that the inner ends of the bolts 66 and 67 constitute fixed abutments or supports which prevent vertical movement of the rotary nut 51. As movement of the spindle downwardly is initiated, the pilot valve 29 is moved away from its seat and pressure is relieved from the interior of the hollow piston 16 through the ports 33 to the exhaust passage. At the same time the pressure from the space below the lower end of the piston 16 and within the cylinder 18 is also relieved through the ports 28. Hence, as soon as the pilot valve is moved off of its seat, the pressure on the lower head of the piston 16 falls almost instantaneously so that the latter is balanced by pressure acting on the substantially equal areas of the opposed shoulders 26 and 27, and hence the valve may readily be opened by further turning the hand wheel 57, the pilot valve pushing the piston ahead of it as the stem 36 is advanced.

Movement of this hand wheel causes the cylindrical head of the pilot valve to move downwardly against the lower end or head of the piston 16 and brings an abutment 76 formed on the lower head of the piston against a similar abutment 77 carried by the lower end 19 of the cylinder 18. With the parts arranged in this condition it will be observed that the tension spring 63 is expanded so as to be under considerable strain. If now, the latch 69 be released from the trip lever 61 by swinging the operating arm 73 in a clockwise direction, the spring 63 becomes effective to move the lever 61 in a clockwise direction about its pivotal mounting 62 on the link 59. This movement causes the inner ends of the nuts 66 and 67 which ride in the circumferential groove 52 to move the nut 51 together with the spindle 36 bodily upwardly which first seats the pilot valve and then brings the main valve disk 14 against its seat.

It will be understood that when the valve closes automatically as just described by tripping of the latch 69, the tension spring 63 contracts and holds the trip lever in its upper position indicated by the dot and dash lines. To reset the parts after automatic closing it is necessary first to turn the hand wheel 57 so as to cause the nut 51 to travel longitudinally or downwardly along the threaded portion 56 of the non-rotatable stem 36. This movement is effective through the bolts 66 and 67 to move the trip lever against the force of spring 63 to the lower position shown in full lines in Fig. 2. The trip lever may then be locked in this position by the latch 69. During this adjustment the force reaction along the stem 36 has been in an upward direction, and hence this reaction has been effective to hold both the pilot and the main valve against their respective seats. Opening of the main valve is finally effected by first operating the hand wheel to move the stem 36 downwardly as previously described so as to unseat the pilot valve, and during this movement and the subsequent movement necessary to open the main valve the bolts 66, 67 function as fixed abutments or supports to hold the rotary nut 51 from displacement vertically.

The horizontally arranged trip valve disclosed in Fig. 4 comprises a body, indicated generally at 80 having an inlet passage 81 extending horizontally through the body to a port defined by an annular seat 82 from which the exhaust passage 83 extends downwardly. The main valve disk 84 cooperates with the seat 82 and is provided with a skirt 86 carrying rings 87 which operate in the bore 88 of a cylinder 89 having a closed end 91. This cylinder is supported in spaced relation from the side walls of the inlet passage by approximately radial webs 92. One or more passages 93 may be arranged to conduct pressure fluid from the inlet passage 81 through the webs 92 into the closed end of the cylinder 89. Preferably the flow through such passages is controlled by an adjusting screw 94 which is held in desired positions of adjustment by a lock nut 96.

The valve disk 84 carries a cylindrical extension 97 which slidably receives a one-piece spindle or stem 98. A pilot valve 99 is mounted upon this stem and has a surface 101 which cooperates with a seat 102 formed on the valve disk 84 to close the ports 103. The valve stem 98 also carries an enlargement 104 providing abutment means for engagement with the adjacent end of the cylindrical extension 97. The valve stem 98 slides in a stuffing box 106 mounted in the valve body and has a threaded portion 107 at one end thereof. This threaded portion is engaged by a rotary nut 108 which is generally similar to the rotary nut 51 illustrated in Figs. 1 and 2. Thus the nut 108 has an exterior circumferential groove 109 receiving the inner ends of bolts 111, these bolts being carried by the opposite arms of the trip lever 112 which embraces the cylindrical guide casing 113 in which the nut 108 is slidably received. The casing 113 also has slots 115 to receive the bolts 111. The trip lever 112 is mounted to pivot intermediate its ends at 114 on a link 116, the latter being mounted to pivot at 117 on a fixed portion of the valve bonnet 119, for example on a bracket 118 projecting from the bonnet. A tension spring 121 is pivotally connected at 122 to one end of the trip lever and at its other end to a bracket 123 carried by the frame.

In this form of the invention, the rotary nut 108 extends beyond the cylindrical housing 113 in the form of a sleeve 124 upon which a beveled gear 126 is splined or otherwise mounted. Preferably this gear is held from axial movement by engagement with adjacent portions 127 and 128 of a gear box 129 forming a part of the valve bonnet which comprises the housing 113 and upper and lower longitudinal legs or struts 131 and 132, the latter being secured in the valve body in any approved manner. A hand wheel 133 is fixedly secured upon a shaft 134 which is rotatably mounted in bearings 136, 137 mounted on the gear box. This shaft has fast thereon a beveled gear 138 which meshes with the gear 126.

The upper and lower members 131 and 132 carry guideways 141 and 142 in which a guide 143 is adapted to operate. This guide is fixedly secured to the spindle 98 in any approved manner so as to be capable of cooperating with the guideways 141 and 142 to permit longitudinal movement of the spindle while preventing any rotation thereof. In all other respects the apparatus disclosed in Fig. 4 is similar to that illustrated in Figs. 1 and 2.

It will be apparent therefore that the valve 84 may be opened by operating the hand wheel 133 so as to rotate the nut 108 in the proper direction to move the pilot valve and the main valve disk 84 successively to the right. As the pilot valve moves away from its seat, the abutment means 104 engages the cylindrical extension 97 and transmits motion directly to the valve disk, pressure being relieved through the ports 103 so that movement of the main valve is readily effected. With the main valve occupying its open position, it will be understood that the valve may be closed automatically by tripping the latch 146 and thereby releasing the force of the tension spring 121 which throws the trip lever in a counterclockwise direction about its pivot 114, this movement being effective to move the nut 108 and the valve stem longitudinally of the left as viewed in Fig. 4 so as to bring both the main valve and the pilot valve against their respective seats.

After this automatic closing, the first step in resetting the parts is to rotate the hand wheel 133 so as to expand the tension spring 121 and bring the trip lever 112 to the position shown in which it is locked by the latch 146. During this movement the main valve remains closed. This having been accomplished, the main valve may then be opened by operating the hand wheel 133 in the same manner as fully disclosed with reference to Figs. 1 and 2.

It should be understood that the present disclosure is for the purpose of illustration only and that this invention includes all modifications and equivalents which fall within the scope of the appended claims.

I claim:

1. A valve device of the class described comprising a casing having therein a valve seat and a valve disk cooperable with the seat, a stem connected to the disk and having a threaded portion, guide means in which the stem reciprocates axially, guide arms rigidly secured to the stem, fixed members substantially parallel to the stem having guideways receiving the end portions of the guide arms, said guideways preventing rotation of the stem while permitting axial movement thereof, an elongate nut engaging the screw-threaded portion of the stem, a trip member engaging the nut and rotatably supporting the same, a hand wheel arranged to rotate about an axis disposed transversely relative to the axis of the stem, gearing between the hand wheel and nut for turning the latter to effect axial movement of the stem relative to the nut, means for maintaining the gearing in mesh during movement of the nut with the stem, releasable means for holding the trip member in position to hold the valve open, and means effective on the release of the releasable holding means for moving the trip member to effect the closing of the valve.

2. A trip valve comprising a casing having therein a valve seat and a valve disk cooperable with the seat, a stem connected to the disk and having a threaded portion, means for supporting the stem for axial movement, diametrically extending guide arms rigidly secured to the stem, a fixed member having guideways receiving the ends of the guide arms to prevent rotation of the stem while permitting axial movement thereof, a trip lever, an elongate nut rotatably mounted on one end of the trip lever, said nut having a threaded engagement with the threaded portion of the stem, a sleeve secured to the nut and extending about the stem, a gear splined to the sleeve to permit longitudinal movement thereof, a second gear meshing with the first and arranged to turn about a fixed axis transversely to the axis of the stem, a hand wheel for operating the second gear to effect movement of the stem relative to the nut, releasable means for holding the trip lever in position to hold the valve open, and means effective on release of the releasable holding means for moving the trip lever to effect the closing of the valve.

3. A trip valve device comprising a casing having therein a valve seat and a valve disk cooperable with the seat, a stem connected to the disk for operating the same, the stem having a screw-threaded portion, a bonnet secured to said casing, guide means carried by the bonnet in which the stem reciprocates axially, guide arms rigidly secured to the stem, a member substantially parallel to the stem mounted in the bonnet, said member having guideways receiving the ends of the guide arms to prevent rotation of the stem while permitting axial movement thereof, an elongate nut engaging the screw-threaded portion of the stem, said nut having a circumferential groove providing an abutment, a trip lever having projections disposed in the groove for rotatably supporting the nut, rotary means for effecting relative rotary movement between the nut and the stem for moving the latter axially in either direction, releasable means for holding the trip lever in position to hold the valve open, and means effective on release of the releasable holding means for moving the trip lever to effect the closing of the valve.

ALEXANDER V. HOSE.